March 22, 1932.  W. J. A. STURTZ, JR  1,850,901
MEASURING DEVICE
Filed Aug. 20, 1930
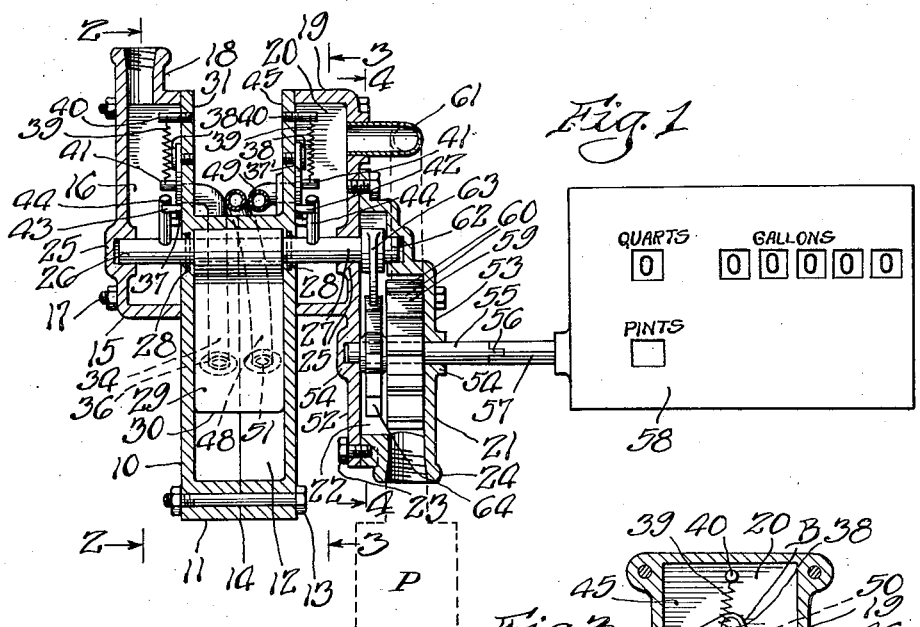
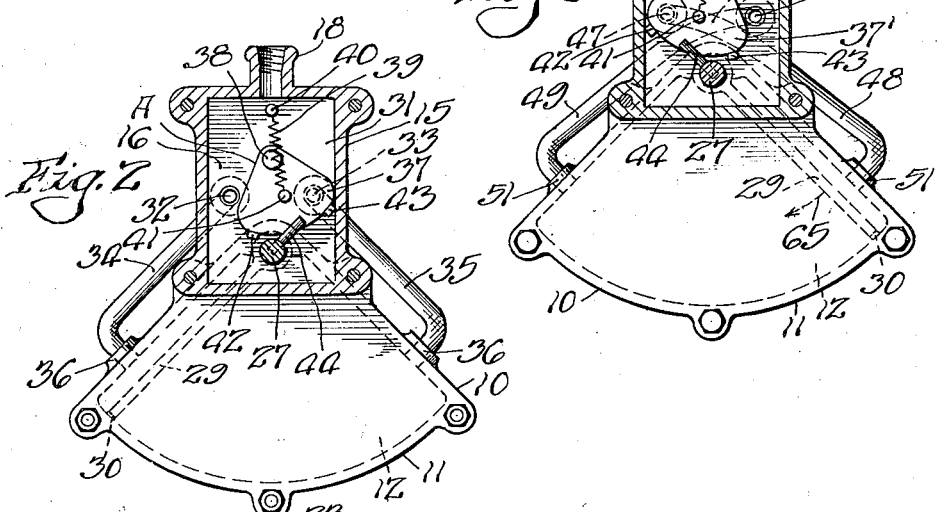
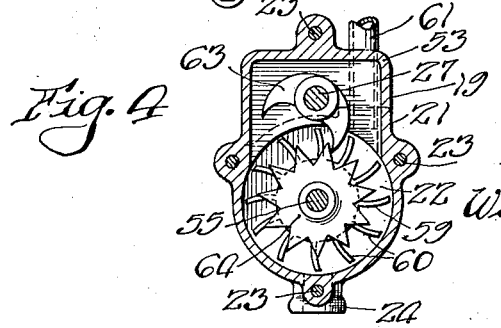
William J. A. Sturtz, Jr.,
INVENTOR
BY Victor J. Evans
HIS ATTORNEY.

Patented Mar. 22, 1932

1,850,901

UNITED STATES PATENT OFFICE

WILLIAM J. A. STURTZ, JR., OF ELMWOOD PARK, ILLINOIS

MEASURING DEVICE

Application filed August 20, 1930. Serial No. 476,703.

This invention relates to certain novel improvements in measuring devices and has for its principal object the provision of an improved construction of this character which will be highly efficient in use and economical in manufacture.

Among the several objects of the invention is to provide a device of this character for accurately measuring the flow of liquid, using in conjunction with the measuring device a suction pump or other like device.

Other objects will appear hereinafter.

The invention consists in the novel combination and arrangement of parts to be hereinafter described and claimed.

The invention will be best understood by reference to the accompanying drawings, showing the preferred form of construction and in which:

Fig. 1 is a sectional detail view of the invention;

Fig. 2 is a sectional detail view taken substantially on the line 2—2 on Fig. 1;

Fig. 3 is a sectional detail view taken substantially on the line 3—3 on Fig. 1; and Fig. 4 is a sectional detail view taken substantially on the line 4—4 on Fig. 1.

Referring more particularly to the drawings, 10 indicates a housing comprising two sections 11 connected together to form a chamber 12 by means of nut bearing bolts 13. The line of juncture between the two sections is sealed by a sealing member 14 so as to make the chamber 12 substantially airtight. Secured to one side of the housing 10 is a casting 15 which provides an airtight chamber 16. This casting 15 is secured to this side of the housing by means of nut receiving bolts 17. The casting is provided with a nipple 18 to which may be threaded a conduit pipe (not shown) which leads from a suitable source of liquid supply such as for example a tank or the like. Secured to the opposite side of the housing is a second casting 19 likewise secured to the housing by means of the nut bearing bolts 17. This casting 19 likewise provides an airtight chamber 20. Secured to the casting 19 is a plate 21 providing a chamber 22 and this plate 21 is secured to the casting 19 by means of bolts 23. The plate 21 provides a nipple 24 to which may be connected a conduit leading to a suction pump P or like device of any approved construction.

The castings 15 and 19 provide bearings 25 in which is journaled the end portions 26 of a shaft 27. This shaft 27 extends through the upper end portion of the housing 10 and operates in sealing rings 28 whereby to prevent the admission of air or the like into the chamber 12.

Carried by the portion of the shaft 27 which extends through the housing 10 is a blade 29 and this blade 29 has its edges provided with sealing strips 30 for reasons which will be hereinafter understood.

Formed in the wall 31 of the housing 10 are oppositely spaced ports 32 and 33 which communicate with conduits 34 and 35 respectively and these conduits communicate as at 36 with the lower end portion of the housing 10 at opposite ends thereof.

A suitable valve mechanism is provided for alternately closing these ports and this valve mechanism may include a valve plate 37 pivotally supported by the wall 31 by a pintle 38. A spring 39 is provided for moving the valve plate 37 in to closing position alternately with these ports after the valve plate and spring have been moved past dead-center with respect to the pintle 38. One end of the spring is connected to the wall 31 by a pin 40 and the opposite end portion of this spring is connected to the plate 37 by a pin 41, which pin extends right angularly from the plate 37. The valve plate provides at its lower end portion laterally extending lugs 42 and 43 which are disposed in the path of movement of a stud 44 carried by the shaft 27. Formed in the wall 45 of the housing 10 are oppositely disposed ports 46 and 47 which communicate with conduits 48 and 49 respectively. These conduits cross each other at a point indicated at 50 and communicate with the lower end of the chamber 12 as at 51.

A suitable valve structure is like wise provided for alternately closing these ports and this valve structure may be constructed substantially similar to the valve structure which alternately closes the ports 32 and 33 and for convenience similar reference characters indicate parts of this latter valve structure which are similar to the valve structure first mentioned.

Provided by the wall 52 of the casting 19 and the wall 53 of the plate 21 are suitable bearings 54 in which is journaled a shaft 55. The outer end of this shaft 55 has connection as at 56 with the shaft 57 of a registering device 58 of any approved construction and arranged to register pints, quarts, and gallons as diagrammatically shown in Fig. 1 of the drawings. I have not gone into detail of the structure of this registering device as any approved structure may be employed.

Mounted within the chamber 22 is a turbine wheel 59 comprising a plurality of spaced fins 60 and arranged so that liquid flowing through a conduit 61 opening communication between the chamber 20 and chamber 22 will flow against these fins and rotate the turbine thus in turn rotating the shaft 55 which in turn rotates the shaft 57.

Pivotally supported on the end 62 of the shaft 27 is an escapement pawl 63 which is adapted to co-operate with an escapement wheel 64 so as to time the rotation of the turbine with the alternative rotation of the shaft 27.

The operation of my invention is as follows:

The suction pump P or like device which may be of any approved structure, is set into operation so as to create a suction in the chamber 22 and this in turn creates a suction through the conduit 61 creating a vacuum in the chamber 20. Referring to Fig. 3 of the drawings, assume that the blade 29 is to move in the direction indicated by the arrow 65. In this position the valve plate 37' of the valve structure B will be disposed so as to open communication between the chamber 20 and the conduit 49. Therefore, a vacuum will be created in the chamber 12 in the direction of movement of the blade 29. At the same time the plate 37 of the valve structure A will be disposed to open communication between the chamber 16 and the conduit 34 so as to open communication between this chamber and the chamber 12 on the side opposite to the movement of the blade 29. Inasmuch as a vacuum or suction is now created in the housing 12 this vacuum or suction will cause the blade to rotate in the direction indicated by the arrow 65 and as this blade is rotated by this suction a vacuum is created on the side of the blade opposite its direction of movement and therefore liquid will be drawn into the chamber 16 through the conduit 34 into the chamber 12. This admission of the liquid will continue until the blade has approximately completed its movement in the direction indicated. At or near the point of completion of movement of the blade 29 each stud 44 will engage the pin 42 of each of the valve structures and pivot the valve plates of these valve structures so as to close passage through the ports 32 and 46 and open passage through the ports 33 and 47. This reverses the course of suction or vacuum through the chambers of the device. Continued operation of the suction pump P will now draw the fluid from the chamber 12 through the conduit 48 into the chamber 20 through the conduit 61 into the chamber 22 against the turbine 59 which will rotate by reason of the suction created in this chamber by the suction pump P. This rotation of the turbine will cause the shaft 55 which in turn rotates the shaft 57 to operate the mechanism of the registering device 58 to indicate the amount of liquid flowing into the suction pump P. When the blade has completed its movement in the direction opposite to that indicated by the arrow 65 the operation is repeated.

From the description herein, taken in connection with the accompanying drawings, it will be seen that I have provided a simple and expeditious arrangement for measuring the flow of liquid.

While I have illustrated one form of valve mechanism it is to be understood that any approved form may be employed without changing the operation of the device.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claims.

Having thus described my invention what I claim as new and desire to protect by Letters Patent is:

1. A measuring device including a body providing a substantially airtight chamber, two members disposed on opposite sides of said body and providing together with certain wall portions of said body two substantially airtight compartments, a member arranged in the chamber for oscillatory movement, means providing communication between said chamber and said compartments on each side of said oscillatory member, a valve mechanism controlling said means whereby said compartments will have alternate communication with said chamber, means operable with the movement of said oscillatory member for operating said valve mechanism, a plate providing together with a wall portion of one of said two members a chamber, means providing communication between the compartment provided by one of said two members and said last mentioned chamber, the other of said two members having a portion providing an inlet nipple, a turbine wheel mounted in said last mentioned chamber, in combination with a suction pump communicating with said last mentioned chamber, and a registering device operable by said turbine wheel.

2. A measuring device including a body providing a substantially airtight chamber, two members disposed on opposite sides of said body and providing together with certain wall portions of said body two substantially airtight compartments, a blade member arranged in the chamber for oscillatory movement and having sealing engagment with the interior walls thereof, means providing communication between said chamber and said compartments on each side of said oscillatory member, a valve mechanism controlling said means whereby said compartments will have alternate communication with said chamber, means operable with the movement of said blade member for operating said valve mechanism, a plate providing together with a wall portion of one of said two members a chamber, means providing communication between the compartment provided by one of said two members and said last mentioned chamber, the other of said two members having a portion providing an inlet nipple, a turbine wheel mounted in said last mentioned chamber, in combination with a suction pump communicating with said last mentioned chamber, and a registering device operable by said turbine wheel.

3. A measuring device including a body providing a substantially airtight chamber, two members disposed on opposite sides of said body and providing together with certain wall portions of said body two substantially airtight compartments, a member arranged in the chamber for oscillatory movement, means providing communication between said chamber and said compartments on each side of said oscillatory movement, a valve mechanism controlling said means whereby said compartments will have alternate communication with said chamber, means operable with the movement of said oscillatory member for operating said valve mechanism, a plate providing together with a wall portion of one of said two members a chamber, means providing communication between the compartment provided by one of said two members and said last mentioned chamber, the other of said two members having a portion providing an inlet nipple, a turbine wheel mounted in said last mentioned chamber, in combination with a suction pump communicating with said last mentioned chamber, and a registering device operable by said turbine wheel.

4. A measuring device including a body providing a substantially airtight chamber, two members disposed on opposite sides of said body and providing together with certain wall portions of said body two substantially airtight compartments, a blade member arranged in the chamber for oscillatory movement and having sealing engagement with the interior walls of said chamber, means providing communication between said chamber and said compartments on each side of said oscillatory member, a valve mechanism controlling said means whereby said compartments will have alternate communication with said blade member, means operable with the movement of said blade member for operating said valve mechanism, a plate providing together with a wall portion of one of said two members a chamber, means providing communication between the compartment provided by one of said two members and said last mentioned chamber, the other of said two members having a portion providing an inlet nipple, a turbine wheel mounted in said last mentioned chamber, in combination with a suction pump communicating with said last mentioned chamber, and a registering device operable by said turbine wheel.

5. A measuring device including a body providing a substantially airtight chamber, two members disposed on opposite sides of said body and providing together with certain wall portions of said body two substantially airtight compartments, a member arranged in the chamber for oscillatory movement, means providing communication between said chamber and said compartments on each side of said oscillatory member, a valve mechanism controlling said means whereby said compartments will have alternate communication with said chamber, means operable with the movement of said oscillatory member for operating said valve mechanism, a plate providing together with a wall portion one of said two members a chamber, means providing communication between the compartment provided by one of said two members and said last mentioned chamber, the other of said two members having a portion providing an inlet nipple, a turbine wheel mounted in said last mentioned chamber, in combination with a suction pump communication with said last mentioned chamber, and a registering device operable by said turbine wheel, and means for regulating proportional movement between said oscillatory member and said turbine wheel.

In testimony whereof I affix my signature.

WILLIAM J. A. STURTZ, Jr.